Figure 5:
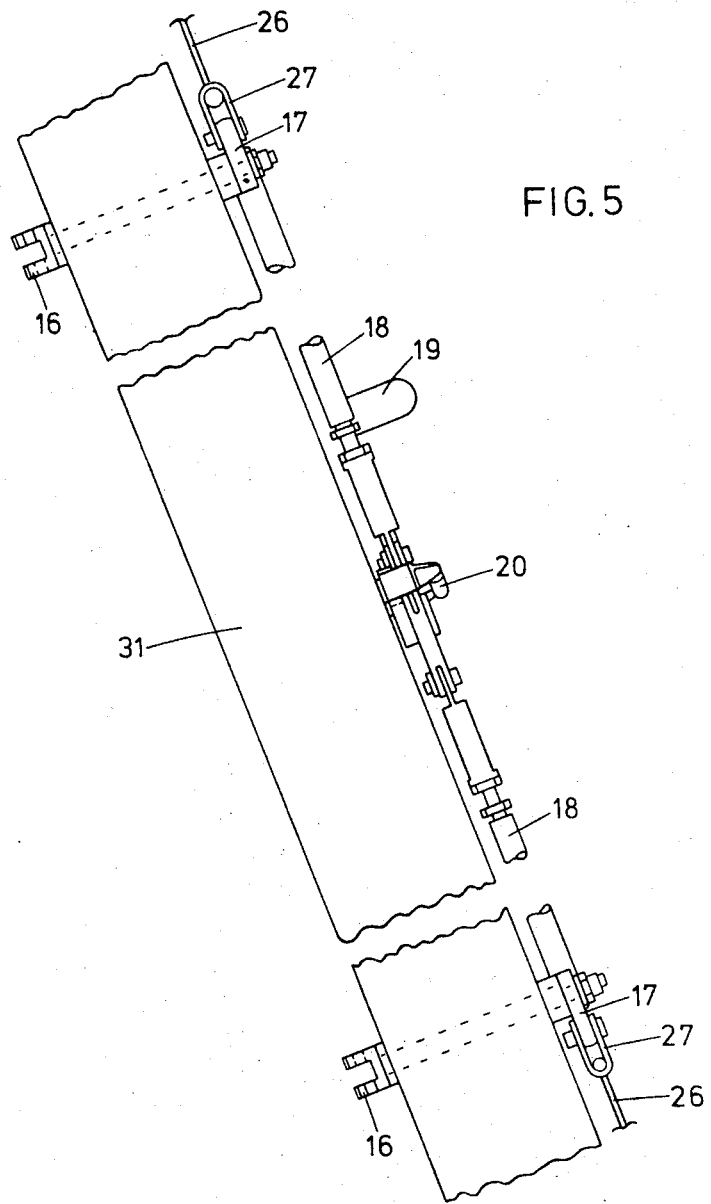

United States Patent [19]

Edwards

[11] 3,851,845
[45] Dec. 3, 1974

[54] APERTURE CLOSURE DEVICES
[75] Inventor: Emrys Ronald Edwards, Chard, England
[73] Assignee: Westland Aircraft Limited, Yeovil, Somerset, England
[22] Filed: Apr. 9, 1973
[21] Appl. No.: 349,197

[30] Foreign Application Priority Data
Apr. 17, 1972 Great Britain.................... 17652/72

[52] U.S. Cl................. 244/129 D, 16/147, 49/141, 49/465
[51] Int. Cl............................................. B64c 1/00
[58] Field of Search .......... 244/129 D; 49/465, 141; 16/171, 147

[56] References Cited
UNITED STATES PATENTS
2,790,992  5/1957  Campbell............................. 16/171
2,800,103  7/1957  Bleeker................................. 49/465
3,085,297  4/1963  Lingerfelt ....................... 244/129 D
3,131,892  5/1964  Salmun ........................... 244/129 D Primary Examiner—Trygve M. Blix
Assistant Examiner—Donald W. Underwood
Attorney, Agent, or Firm—Larson, Taylor & Hinds

[57] ABSTRACT

This invention relates to an aperture closure device incorporating a quick release mechanism and, in the embodiment shown, is adapted for incorporation in an aircraft door to effect jettisoning of the door in an emergency. The device includes a plurality of separable hinges operated by a single lever from within the aircraft which can further incorporate means for simultaneously releasing the normal door closing mechanism, thereby effecting complete release of the door by operation of the single lever.

15 Claims, 12 Drawing Figures

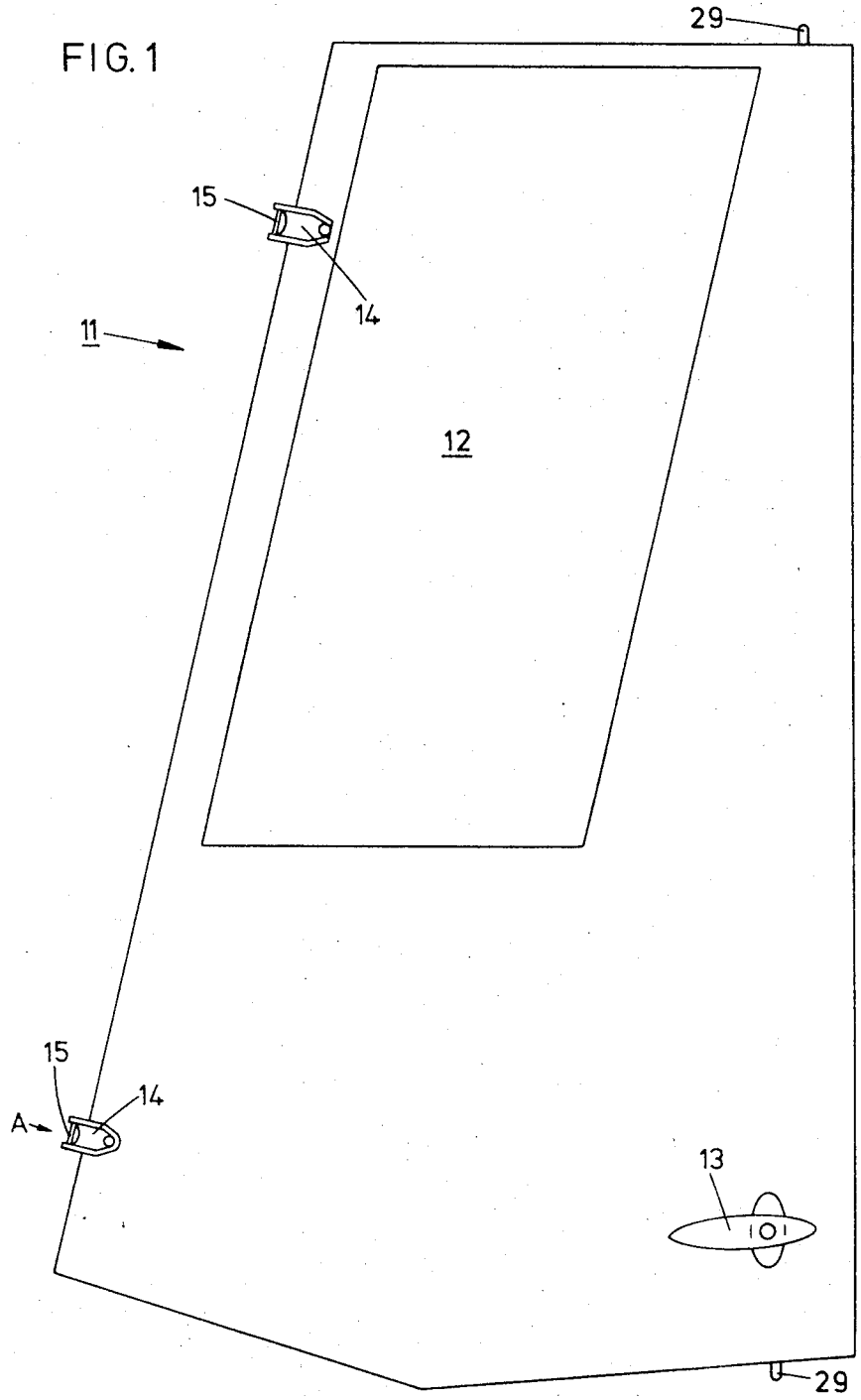

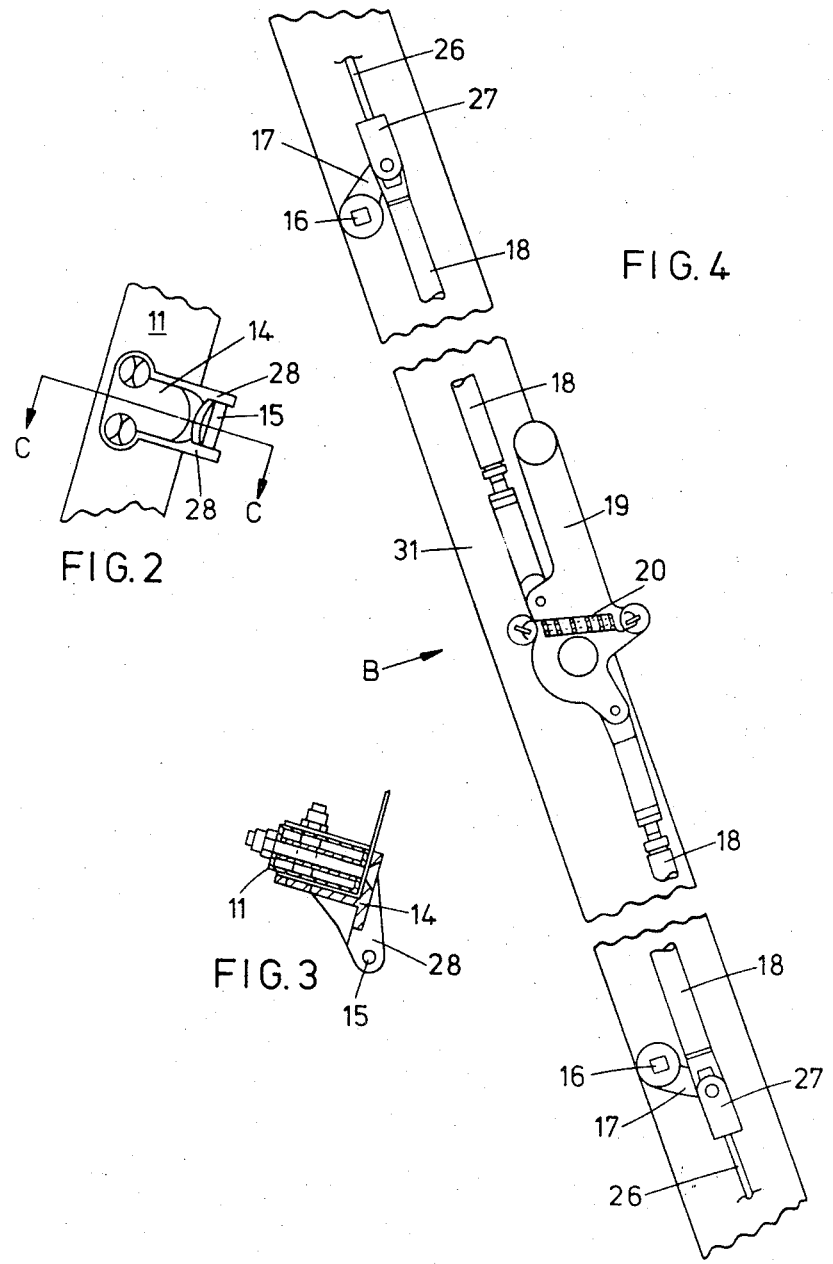

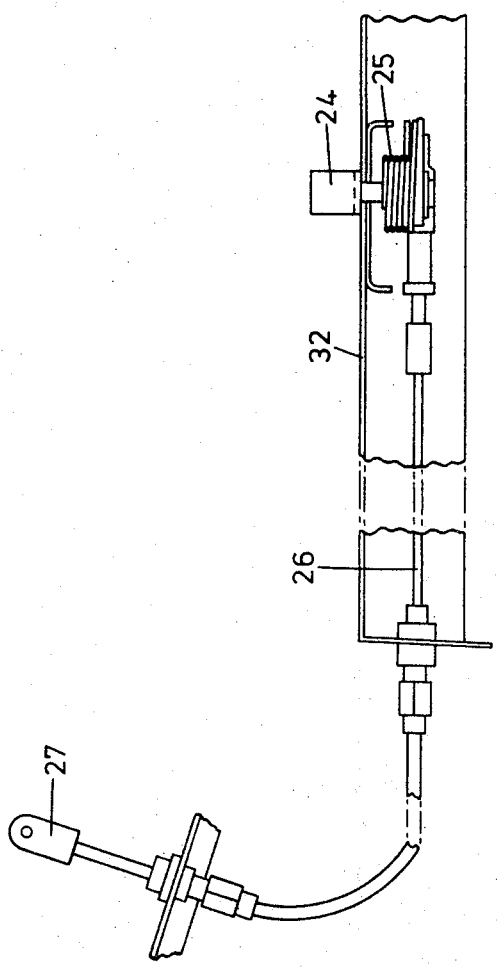

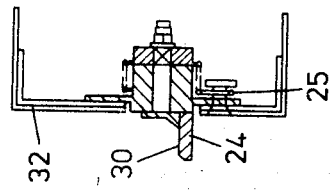
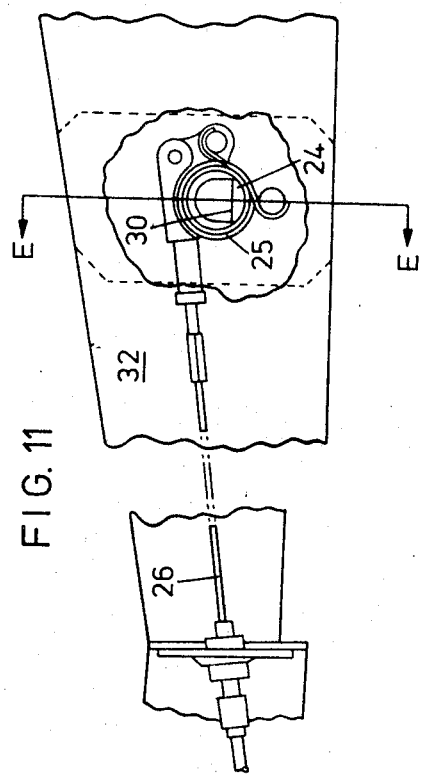
FIG. 12
FIG. 11

APERTURE CLOSURE DEVICES

This invention relates to aperture closure devices, and more particularly to such devices incorporating a release mechanism to facilitate quick release or jettisoning of a closure member.

According to the invention I provide an aperture closure device including a closure member and a plurality of supporting means each comprising a first part mounted on the closure member and a second part mounted on a supporting structure adjacent the aperture, wherein one of the parts of each supporting means is rotatable between a position in which it retains its associated other part and a position in which its associated other part is released to permit removal of the closure member.

According to another aspect of the invention I provide an emergency release mechanism for a vehicle door including two spaced selectively releasable hinge means located along one edge of the door, wherein each hinge means comprises a hinge pin spaced from the edge of the door parallel therewith and supported at its ends between two parallel flange members extending from the door, and an associated hinge comprising a bolt-like member having one end rotatably mounted in supporting structure adjacent the door aperture and an enlarged cylindrical shaped head portion protruding from the structure for location between the flange members and having an open-ended slot to mate with the hinge pin and extending from its open end in a direction initially parallel with the longitudinal axis of the bolt-like member, then in a plane normal to the longitudinal axis through an angle of approximately 90°, and means for simultaneously rotating each member through approximately 90° so that when the members are orientated with the hinge pins located at the ends of the 90° portion of the slots the pins are retained to act as hinges about which the door swings, and when the members are rotated through 90° each hinge pin is aligned with the longitudinally extending portion of its associated slot, thereby ensuring release of the pins through the slots to effect release of the door.

Figure 8:
Figure 7:
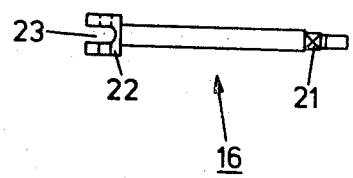
Figure 9:
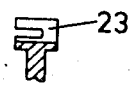
Figure 6:
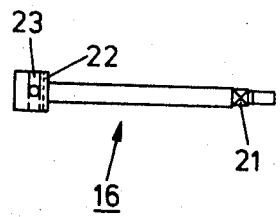

The invention will now be described by way of example only and with reference to the accompanying drawings, in which:

FIG. 1 is an external side view of a door member for closing an aperture in a helicopter cabin, FIG. 2 is a fragmentary view taken on arrow A of FIG. 1, FIG. 3 is a sectioned view on arrows C—C of FIG. 2, FIG. 4 is a side view from inside the cabin of a door jettison mechanism according to one embodiment of the invention, To closing, FIG. 5 is a view on arrow B of FIG. 4, FIG. 6 is a side view of a detail part of the mechanism, FIG. 7 is a plan view on FIG. 6, FIG. 8 is an end view on FIG. 7, FIG. 9 is a sectioned view taken on lines D—D of FIG. 8, FIG. 10 is a side view from outside the cabin and with the structure broken away to show a further feature of the invention, FIG. 11 is a plan view of part of FIG. 10 with the supporting structure broken away, and FIG. 12 is a sectioned view taken on lines E—E of FIG. 11.

Referring now to FIG. 1, a door member 11 is shaped to close an aperture in a helicopter cabin (not shown). The door 11 includes a sliding window 12 and means comprising inner and outer handles 13 operatively connected to push-pull rods 29 to effect closure of the door 11 during normal operation. Two brackets 14 are bolted on one edge of the door 11, each bracket 14 incorporating a hinge pin 15 by which the door is mounted on the cabin structure. From FIGS. 1, 2 and 3 it will be clear that each hinge pin 15 is spaced from the edge of the door 11 and parallel therewith, and is supported at its ends between the two parallel flange members 28 formed integral with the brackets 14.

Each hinge pin 15 is located in a hinge 16 rotatably mounted in cabin structure 31 adjacent the aperture to be closed by the door (FIGS. 4 and 5). The hinges have a squared end for location in levers 17 connected by rods 18 to a rotatably mounted operating lever 19. As will be evident from FIG. 4, the lever 19 is restrained by a stop on the support structure 31 for movement through an arc of approximately 120°, and a coil spring 20 located between the stop and the lever 19 is positioned to act as an over-centre mechanism to bias the lever 19 into either of its two operating positions after it has been moved through a part of its arc of movement in either direction. The lever 19 may incorporate a manual reset mechanism.

FIGS. 6 to 9 inclusive are detail views of the hinges 16. Each hinge is a bolt-like member having a squared section 21 at its threaded end and an enlarged cylindrical shaped head portion 22 for location between the parallel flange members 28 (FIGS. 2 and 3). The head portion 22 has an open-ended slot 23 extending in a plane initially parallel with the longitudinal axis then in a plane normal to the longitudinal axis through an angle of approximately 90°. The hinges 16 are handed by the direction of the slot 23 normal to its longitudinal axis (one hand only being shown in FIGS. 6 to 9), each installation as shown in the drawings comprising one hinge 16 of each hand arranged to be rotated in opposite directions by the lever 19. The slot 23 is sized to provide location for the hinge pins 15 (FIGS. 1, 2 and 3), so that when in the position shown in FIGS. 4 and 5 the hinge pins 15 are located at the ends of the slots 23 normal to the longitudinal axis of the hinge 16 with the head portion 23 of the hinge 16 located between the flanges 28 on the brackets 14 to act as a pivot about which the door 11 swings. When the two hinges 16 are rotated through approximately 90° by the lever 19 the hinge pins are released through the portion of the slot 23 parallel with the longitudinal axis of the hinge 16 to facilitate jettisoning of the complete door 11. It is to be noted that the longitudinally extending portion of the slot 23 is of larger width than the portion of the slots extending normal to the axis. This ensures both efficient operation as a hinge and unhindered release of the pins when the hinges 16 are rotated.

With the mechanism hereinbefore described it will be understood that to effect jettisoning of the door 11, lever 19 is operated to release the hinges, and handle 13 has to be operated to release the door closure mechanism. A further feature of the present invention now to be described discloses an associated mechanism for effecting automatic release of the door closure mechanism upon operation of the lever 19, so that jettisoning of the door 11 is accomplished by movement of one lever only, thereby further simplifying the procedure.

The handles 13 are operatively connected to two push-pull rods 29 (FIG. 1) extending generally vertically above and below the pivotally mounted handle 13. The push-pull rods 29 are such that when extended the ends of the rods protrude from the upper and lower surfaces of the door 11 to contact abutments protruding from the surrounding cabin structure 32. When retracted by operation of the handles 13 the rods clear the abutments to permit opening of the door 11 about the hinges 16.

In FIGS. 10 to 12 inclusive, one only of the abutment arrangements is shown, which co-operates with the lowermost of the two rods 29. It is to be understood that a similar arrangement is incorporated for the uppermost rod 29 and protrudes downwardly from the supporting structure above the door.

From FIGS. 10 to 12 inclusive it will be seen that the abutment surface 30 is formed on the protruding portion of a swivel catch 24 rotatably mounted in the cabin structure 32 surrounding the aperture. A spring member 25 is associated with the swivel catch 24 to maintain the catch 24 in the position shown in which the abutment surface 30 is located for contact by the extended push-pull rod 29 (FIG. 1) to maintain the door 11 in the closed position.

One end of a cable 26 is attached to the swivel catch 24, the cable 26 being routed through the structure 32 to terminate in a fork end 27. Referring now to FIGS. 4 and 5, it will be seen that the two fork ends 27 (the uppermost being connected to the uppermost swivel catch (not shown), are pivotally attached to the operating levers 17 forming part of the mechanism previously described so that rotational movement of the levers 17 is transmitted through the cables 26 to rotate the catches 24 through approximately 90° against the action of the springs 25. Rotation of the catches 24 through 90° serves to release the ends of the push-pull rods 29 from engagement with the abutment surface 30 on the swivel catches 24 without operation of the handle 13, thereby completing freeing the door by operation of the lever 19 only.

In normal operation the door is mounted with the hinge pins 15 (FIGS. 1, 2 and 3) located in the hinges 16 (FIGS. 4 to 9) TO permit pivotal movement of the door and facilitate opening and closin g, the door being maintained in the closed position by location of the push-pull rods 29 operated by the handles 13 behind the abutment surfaces 30 on the protruding portions of the swivel catches 24 (FIGS. 10, 11 and 12). When it is required to jettison the door 11 in an emergency the lever 19 is moved clockwise to a position in which it is maintained by the over-centre toggle action of the spring 20, and in which it is locked by the manual reset mechanism (if fitted). This movement of the lever 19 is transmitted by the rods 18 to rotate the upper lever 17 in a clockwise direction and the lower lever 17 in a counterclockwise direction to release the hinge pins 15 through that portion of the slots 23 in each hinge 16 which extends in a plane parallel to the longitudinal axis of the hinge 16. At the same time movement of the levers 17 is transmitted through the cables 26 to rotate the swivel catches 24 to release the ends of the push-pull rods 29, as previously described, thereby effecting immediate jettisoning of the door 11 by operation of a single lever. To reset the mechanism the lever 19 is rotated counterclockwise to the position shown in FIG. 4 in which the lever 19 is maintained by the over-centre toggle action of the spring 20.

Although one embodiment is described and illustrated it is to be understood that modifications can be made without departing from the scope of the invention. For instance, the head portion 22 of each hinge 16 can be of spherical shape having two flats in a plane parallel to the longitudinal axis of the hinge. The hinge pin 15 is not required. A concave surface to mate with the spherical surfaces of the hinge 16 is formed on the facing flanges 28 of the brackets 14 providing a hinge action for normal opening or closing of the door 11. Rotation of the hinges 16 through approximately 90° will align the parallel flats with the facing flanges 28 of the brackets 14, the width of the flats being such that the brackets 14 are released from the hinges 16 to jettison the door 11. The shape of the abutment surface on the protruding portion of each swivel catch 24 can be of any suitable shape and may, for instance, be either substantially flat (as shown) or it may be either concave or angled.

The hinges 16 are not necessarily handed, in which case the rods 18 are arranged to rotate the operating levers 17 in the same direction. Any suitable number of hinges 16 can be incorporated for supporting the closure member, any additional hinges being operated by the single lever 19 through suitable extensions of the operating rods 18. The swivel catches 24 could be replaced by parts similar to either of the constructions previously described for the hinge 16.

The invention is not limited to closure arrangements in which the closure member is hingedly mounted, and can, for instance, form the release mechanism for covers or hatches which are removed only in an emergency. In this case the support means are located all around the closure member and are connected to a single operating lever 19 by either flexible cables or by control rods having suitable pivotally mounted connections at the corners.

I claim as my invention:

1. An aperture closure device comprising in combination, a closure member, a plurality of supporting means each comprising a hinge pin spaced from an edge of the closure member parallel therewith and supported at its ends between two parallel flange members extending from the closure member, and a hinge in the form of a bolt-like member rotatably mounted in a supporting structure adjacent the aperture and having a cylindrical shaped head portion for location between the flange members on the closure member when the closure member is fitted, the cylindrical shaped head portion having a slot adapted to mate with the hinge pin supported by the flange members, such that rotation of the hinge is effective to retain and to release its associated pin.

2. A device as claimed in claim 1, wherein the slot in each head portion extends in a direction initially parallel with the longitudinal axis of the hinge then in a plane normal to the longitudinal axis through an angle of approximately 90° so that when each hinge is orientated with the hinge pin located at the ends of the 90° portion of the slot the closure member is retained and when the hinges are rotated through approximately 90° so that each hinge pin is aligned with the longitudinally extending portion of the slot, the hinge pin is released.

3. A device as claimed in claim 2, wherein a lever is secured on a threaded end of each bolt-like member which protrudes from a surface of the supporting structure opposite to that on which the closure member is fitted, the levers being connected to a rotatably mounted operating lever so that movement of the operating lever is effective to rotate the hinges between their retaining and releasing positions.

4. A device as claimed in claim 3, wherein the plurality of supporting means are located along one edge of the closure member so that when the hinge pins are retained in the hinges the closure member can swing about the hinges between open and closed positions.

5. A device as claimed in claim 4, further including means for securing the closure member in its closed position, said closing means including a handle operatively connected to at least one push-pull rod so that operation of the handle is effective to extend or retract the free end of the rod from an edge of the closure member, wherein said at least one push-pull rod co-operates, when extended, with a protruding portion of a swivel catch rotatably mounted in the supporting structure in alignment with its associated rod, and shaped so that when rotated through approximately 90° the end of the push-pull rod is released without operation of its associated handle.

6. A device as claimed in claim 5, wherein said at least one swivel catch is connected by a flexible cable to one of the levers secured on the threaded end of each hinge so that rotation of the operating lever releases the hinges and the ends of the push-pull rods to effect release of the closure member.

7. A device as claimed in claim 6, wherein said at least one swivel catch is biased by spring means to the position in which the end of the extended push-pull rod is retained.

8. A device as claimed in claim 3, wherein spring means cooperate with the operating lever to maintain the lever in either of its two positions.

9. An emergency release mechanism for a vehicle door including two spaced selectively releasable hinge means located along one edge of the door, wherein each hinge means comprises a hinge pin spaced from the edge of the door parallel therewith and supported at its ends between two parallel flange members extending from the door, and an associated hinge comprising a bolt-like member having one end rotatably mounted in supporting structure adjacent the door aperture and an enlarged cylindrical shaped head portion protruding from the structure for location between the flange members and having an open-ended slot to mate with the hinge pin and extending from its open end in a direction initially parallel with the longitudinal axis of the bolt-like member then in a plane normal to the longitudinal axis through an angle of approximately 90°, and means for simultaneously rotating each member through approximately 90° so that when the members are orientated with the hinge pins located at the ends of the 90° portion of the slots the pins are retained to act as hinges about which the door swings, and when the members are rotated through approximately 90° each hinge pin is aligned with the longitudinally extending portion of its associated slot, thereby ensuring release of the pins through the slots to effect release of the door.

10. An emergency release mechanism as claimed in claim 9, wherein the means for simultaneously rotating each bolt-like member comprises a lever secured on the threaded end of the member protruding from the inside of the structure, the levers being connected by rods to a rotatable operating lever mounted on the structure intermediate the members and being restrained for movement through an arc to effect the required rotational movement of the members.

11. An emergency release mechanism as claimed in claim 10, further including spring means associated with the operating lever for maintaining the lever in position at either end of its operating arc.

12. An emergency release mechanism as claimed in claim 10, wherein the bolt-like members are handed by the direction of the portion of the slot normal to the longitudinal axis of the member, the rods and operating lever being adapted so that the members are rotated through 90° in opposite directions by movement of the operating lever.

13. An emergency release mechanism as claimed in claim 10, the door including closure means comprising internal and external handles operatively connected to one end of two rods supported by the door structure, so that movement of the handles causes extension and retraction of the free ends of the rods from opposed edges of the door, and two abutments protruding from the door supporting structure in alignment with the rods and having a surface arranged for contact by the free ends of the extended rods to maintain the door in a normally closed position, wherein the surfaces are formed on two rotatably mounted swivel catches, the swivel catches being connected by flexible cables routed through the supporting structure to the levers secured on the threaded end of the rotatable hinge members, the arrangement being such that movement of the operating lever to release the hinge pins is also effective to rotate the swivel catches and release the ends of the extended rods without necessitating operation of the associated handles.

14. An emergency release mechanism as claimed in claim 13, wherein spring means are associated with each swivel catch to bias the catch to the position in which the catch provides an abutment surface for the extended rod.

15. An emergency release mechanism as claimed in claim 9, wherein the vehicle is a helicopter.

* * * * *